(12) United States Patent
Hochendoner et al.

(10) Patent No.: US 8,687,630 B2
(45) Date of Patent: Apr. 1, 2014

(54) EMERGENCY ALERTING DEVICE

(75) Inventors: David Hochendoner, Allison Park, PA (US); Timothy Means, Verona, PA (US); Storm Orion, Pittsburgh, PA (US)

(73) Assignee: Metis Secure Solutions, LLC, Oakmont, PA (US)

( * ) Notice: Subject to any disclaimer, the term of this patent is extended or adjusted under 35 U.S.C. 154(b) by 755 days.

(21) Appl. No.: 12/479,273

(22) Filed: Jun. 5, 2009

(65) Prior Publication Data

US 2009/0303993 A1 Dec. 10, 2009

Related U.S. Application Data

(60) Provisional application No. 61/059,130, filed on Jun. 5, 2008, provisional application No. 61/059,135, filed on Jun. 5, 2008.

(51) Int. Cl.
*H04L 12/28* (2006.01)

(52) U.S. Cl.
USPC ........ 370/389; 370/254; 370/343; 340/384.1; 340/500; 340/506; 340/540; 379/37; 455/150.1; 455/404.1

(58) Field of Classification Search
USPC ............... 340/384.1, 500, 506, 540; 370/254, 370/343, 389; 379/37; 455/150.1, 404.1
See application file for complete search history.

(56) References Cited

U.S. PATENT DOCUMENTS

| | | | |
|---|---|---|---|
| 6,198,914 B1 | 3/2001 | Saegusa | |
| 6,320,501 B1 | 11/2001 | Tice et al. | |
| 6,480,578 B1 | 11/2002 | Allport | |
| 6,909,357 B1 * | 6/2005 | Bandy et al. | 340/5.65 |
| 6,957,041 B2 | 10/2005 | Christensen et al. | |
| 7,113,701 B2 | 9/2006 | Okada et al. | |
| 7,184,744 B1 | 2/2007 | Schnabel | |
| 7,230,528 B2 | 6/2007 | Kates | |
| 7,233,781 B2 | 6/2007 | Hunter et al. | |
| 7,266,383 B2 | 9/2007 | Anderson | |
| 7,664,233 B1 | 2/2010 | Kirchmeier et al. | |
| 7,860,525 B2 | 12/2010 | Parkkinen et al. | |
| 2004/0080427 A1 | 4/2004 | Odinak et al. | |
| 2005/0054361 A1 | 3/2005 | Turcanu et al. | |
| 2005/0159132 A1 | 7/2005 | Wright et al. | |
| 2007/0207771 A1 * | 9/2007 | Bowser et al. | 455/404.1 |
| 2008/0030319 A1 | 2/2008 | McKenna et al. | |
| 2008/0070522 A1 | 3/2008 | Marriott et al. | |
| 2009/0075625 A1 * | 3/2009 | Jackson et al. | 455/404.1 |
| 2009/0102644 A1 | 4/2009 | Hayden | |
| 2010/0048235 A1 | 2/2010 | Dai et al. | |

OTHER PUBLICATIONS

SIMA Products Corporation, "It's time to get smart about Public Notification", Product Catalog, 2004.

* cited by examiner

*Primary Examiner* — Nicholas Sloms
(74) *Attorney, Agent, or Firm* — Fox Rothschild LLP (57) ABSTRACT

A communication device for transmitting and receiving messages via an emergency notification network. The communication device includes a receiver configured to receive a data packet from a data broadcasting system, a processor operably connected to the receiver and configured to process the data packet, a memory operably connected to the processor and configured to store data, a mesh network transceiver operably connected to the processor and configured to transmit the received data packet via a mesh network to at least a second communication device, and an output device operably connected to the processor and configured to present an alert corresponding to the data packet.

19 Claims, 4 Drawing Sheets

EMERGENCY ALERTING DEVICE

B. CROSS REFERENCE TO RELATED

This application claims the priority benefit of U.S. Provisional Application No. 61/059,130 and U.S. Provisional Application No. 61/059,135, each of which was filed on Jun. 5, 2008.

C-E.

Not Applicable

F. BACKGROUND

Emergency warning systems serve as a critical link in the chain of crisis communications, and they are essential to minimizing loss in an emergency. Acts of terrorism and violence, chemical spills, amber alerts, nuclear facility problems, weather-related emergencies, flu pandemics and other emergencies all require officials such as government agencies, building managers, university administrators and others to quickly and reliably distribute emergency information to the public.

Current emergency warning systems contain many drawbacks. For example, systems that use a cellular phone network or radio broadcast network are often unable to reach individuals who are located inside of buildings. The interiors of many buildings at universities, research centers, office complexes, manufacturing plants and other locations often have very poor radio and cellular phone reception because of interference from equipment located within the building, or because of a shielding effect created by the building structure itself.

In addition, current emergency systems are not easily able to reach the right people, in the right location, at the right time. Cellular phone services, text messaging services and e-mail services can target specific individuals, but they will not be effective for a location-specific emergency because such services target individuals by phone number or e-mail address, regardless of physical location. Sirens can provide a quick alert, but they may not yield desired results because the sound may not reach all locations, and some individuals in an area may ignore a siren that provides no specific information about the emergency. Reverse 911 calling is effective for targeting a geographic location, but not everyone has a land-line telephone. People relying solely on cellular telephones would be excluded from the warning. Networks like Ethernet and WiFi are prone to failure in times of an emergency due to potential power outages shutting down the network or one or more network devices, thereby causing communication failure with an entire building or geographical area.

Therefore, the disclosure contained herein describes methods of resolving one or more of the problems discussed above.

G. SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "transmitter" is a reference to one or more transmitters and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In one general respect, the embodiments disclose a communication device. The communication device includes a receiver configured to receive a data packet from a data broadcasting system, a processor operably connected to the receiver and configured to process the data packet, a memory operably connected to the processor and configured to store data, a mesh network transceiver operably connected to the processor and configured to transmit the received data packet via a mesh network to at least a second communication device, and an output device operably connected to the processor and configured to present an alert corresponding to the data packet.

In another general respect, the embodiments disclose a communication device. The communication device includes a first receiver configured to receive a data packet from a data broadcasting system, a second receiver configured to receive a data packet from a data broadcasting system, a processor operably connected to the first receiver and the second receiver and configured to process any received data packets, a memory operably connected to the processor and configured to store data, a mesh network transceiver operably connected to the processor and configured to transmit the received data packet via a mesh network to at least a second communication device, an input device operably connected to the processor and configured to provide additional data related to an operating environment of the communications device, and an output device operably connected to the processor and configured to present an alert corresponding to the data packet.

In another general respect, the embodiments disclose a communication device. The communication device includes a mesh transceiver configured to receive a data packet transmitted from another device over a mesh network, a processor operably connected to the mesh transceiver and configured to process the data packet, an input device operably connected to the processor and configured to provide additional data related to an operating environment of the communications device, and an output device operably connected to the processor and configured to present an alert corresponding to the data packet.

I. DETAILED DESCRIPTION

Figure 1:
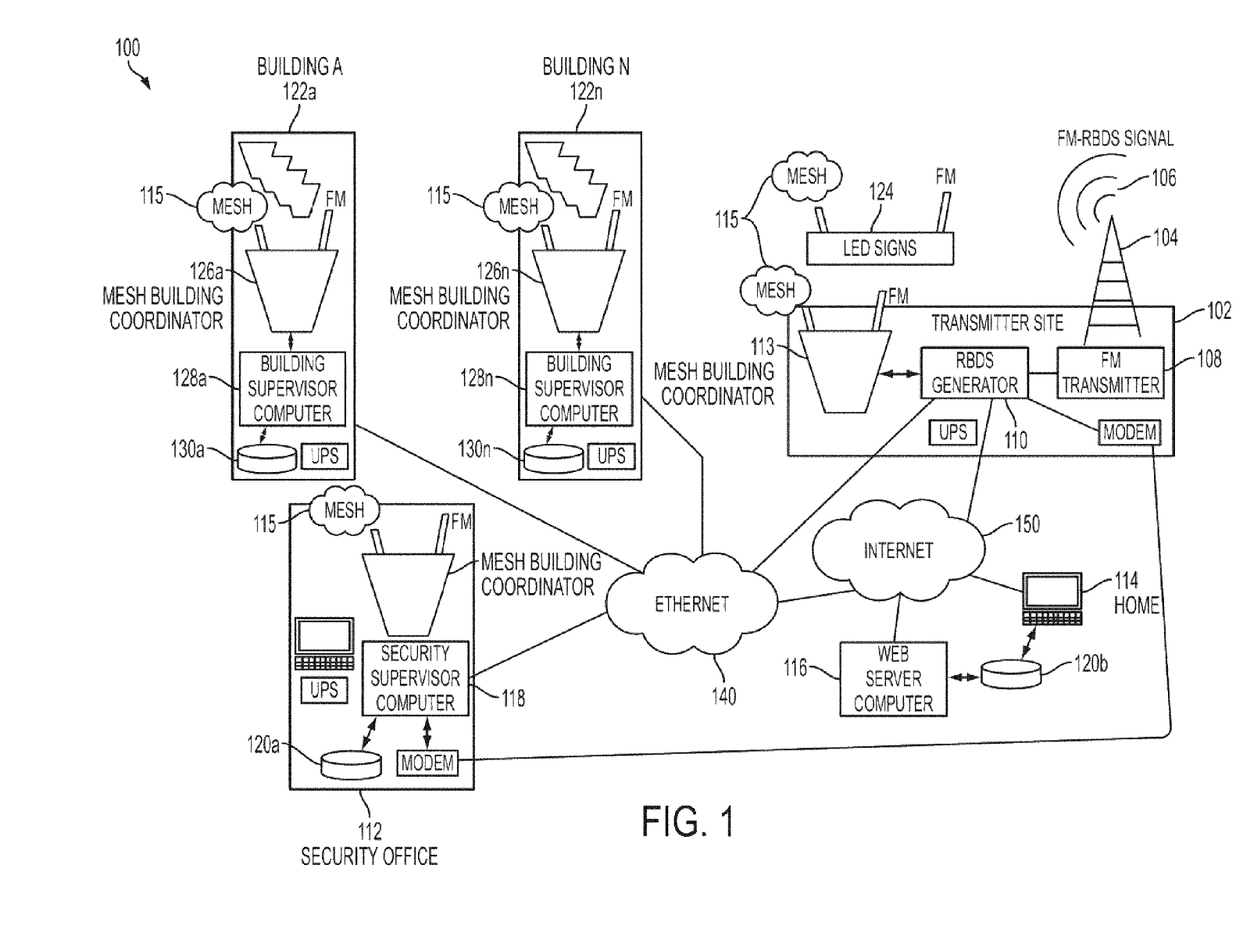
FIG. 1 is a block diagram that depicts exemplary assets of a communications network.

It is to be understood that at least some of the figures and descriptions of the invention have been simplified to focus on elements that are relevant for a clear understanding of the invention, while eliminating, for purposes of clarity, other elements that those of ordinary FIG. 1 illustrates an emergency notification system 100. the system may include, or it may receive signals from, a transmitter site 102 including a broadcasting tower 104 that transmits a signal 106 over public air space. The signal 106 may include a radio broadcast data system (RBDS) signal that includes data representative of one or more messages and may or may not be encrypted, depending on the application. For example, as shown in FIG. 1, the signal 106 may be generated by an FM transmitter 108 and RBDS generator 110 that converts a message received from a security office 112, home computer 114 or a web based server 116 such that it may be carried on a radio data system (RDS) subcarrier of the signal 106. Other signals capable of carrying data, such as HD radio signals, HDTV signals, and other signals that transmit data by over the air broadcast methods, may be used. Transmitter site 102 may further include a mesh coordinator 113 connected to RBDS generator 110 and configured to send a similar message via a mesh signal 115.

Security office 112 may include one or more security supervisory computers 118 connected, via a wired or wireless connection, to the RBDS generator 110. Similarly, home computer 114 or web based server 116 may connect to the RBDS generator via a wired or wireless connection. Similarly, home computer 114, web based server 116 and security supervisory computers 118 may have access to one or more of a series of databases 120a, 120b. The databases 120a, 120b may contain information specific to the emergency notification system 100 such as contact information, prepared messages and alerts, and various other related data such as where any hazardous materials are stored. The databases 120a, 120b may also be used by home computer 114, web based server 116 and one or more security supervisor computers 118 to establish and store a history log of all events for which notifications have been sent. This log may include who sent a notification, when it was sent, where it was sent, the status of any units receiving the notification (e.g., power status, battery life), and any additional information that may be useful in monitoring the status of the emergency notification system 100.

As used in this document, the term "home computer" does not mean that the computer need be physically located in a home, and the term "security supervisor computer" does not mean that the computer need by used by a security supervisor. Rather, the term "security supervisor computer" is used to refer to a computing device that is connected to one or more notification system databases, and the term "home computer" is simply intended to refer to a computer that is separate from the security supervisor computer.

The signal 106 may be directed to and received by receivers at multiple facilities such as building 122a and 122n. In each building 122a, 122n, a building coordinator 126a, 126n receives the signal 106 as an FM signal, decodes the message, formats the message and broadcasts the message to other devices in the building via a mesh network. A mesh network is a network having multiple devices configured to communicate with one another via multiple "hops", or transmissions between additional devices. This arrangement allows for continuous connection between various devices as any blocked paths or broken connections are hopped around. As a result, a mesh network has a high level or reliability. Typically, mesh networks use one of sixteen selected frequencies to broadcast information, controlled by processors in the mesh network devices. More or less than sixteen frequencies may be used dependent on the frequency band allocated for the mesh network. The individual coordinators 126a, 126n as well as the other devices connected to the mesh network are discussed below in greater detail in the discussion of FIGS. 3 and 4.

Each building may also include a building supervisor computer 128a, 128b. A security office, administrator or other authorized personnel may use building supervisor computers 128a, 128n to directly send a message to receivers in the same building. Similarly, a user can utilize building supervisor computers 128a, 128n to access RBDS generator 110 via Ethernet 140 and/or Internet 150 to broadcast an emergency message via broadcasting tower 104 and/or via mesh coordinator 113 as a mesh signal 115. Each building supervisor computer may be configured to access various databases 130a, 130n. The databases 130a, 130n may include information related to the notification devices and receivers contained in each building, as well as information specific to the emergency notification system 100 such as contact information, prepared messages and alerts, and various other related data. It should be noted that only two buildings are shown in FIG. 1 by way of example only. The term "building supervisor computer" does not mean that the computer need be used by a building supervisor. Rather, the term "building supervisor computer" is used to refer to a computing device—separate from the security supervisor computer and the home computer—that may be connected to one or more notification system databases, and which may be used to generate notification messages.

Additionally, the signals 106 and 115 may be received by standalone devices such as LED sign 124 equipped with an FM receiver. The LED sign 124 may include decoding and processing components for decoding a message contained in signal 106 and displaying any appropriate text.

Figure 2:
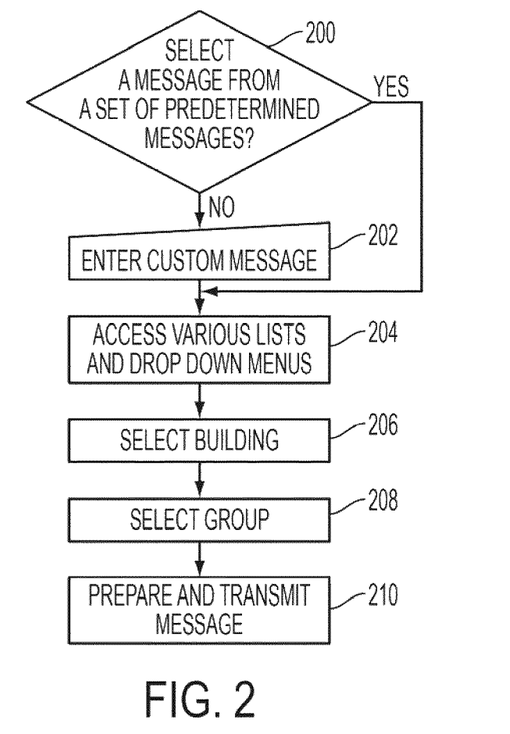
FIG. 2 depicts a flow chart with an exemplary message generation process.

A user may use a data entry device such as home computer 114 to create a message to be directed at a particular building, or to a group of receivers within a particular building. The message may also be intended for all buildings and device on the emergency notification system 100. Referring to FIG. 2, the user may select 200 a message from a set of predetermined messages or enter 202 a custom message. The user may then access 204 various lists and drop down menus to assist the user in selecting recipients of the message. From the lists or drop down menus, a user may select 206 a building or buildings to which the message should be directed. The user may also select all devices included in the emergency notification system. The user also may select 208 a group of one or more receiving devices within the facility. A group may be a particular geographic location such as a floor of a building, or a group of buildings/locations, such as all dormitories, all classrooms, all bathrooms, all outdoor gathering spaces, or other specific areas such as zip codes or geographic blocks created by placing a grid on a map. After the message, facility and group are selected, the message is transferred to the RBDS generator 110 via a wired or wireless connection (e.g., Ethernet 140, Internet 150, a mesh network signal, telephone, satellite connections, direct connection) and the generator may prepare and transmit 210 the message via the broadcasting tower 104 and/or via mesh coordinator 113. It should be noted RBDS is shown only by way of example, and other encoding protocols may be used, such as HD radio encoding.

The signals 106 and 115 preferably include a packet of information. The packet may include a first data bit set or sets that correspond to the location of the facility. A second data bit set or sets correspond to a group or groups within the facility. The third data bit set or sets correspond to the message itself. The order of the data bit sets described above is not required, and the packet may include this information or additional information in any order. The message can be of varying size. For example, a standard or predetermined message may simply be represented by a message code rather than the entire message, so that the receiving device can identify a message based on the code. On the other hand, a custom message may be longer and require a longer packet or multiple packets. In some embodiments, the data packet may include additional information such as the time of day, time the message was sent, the sender of the message, various conditions for the receiving device (e.g., volume levels, duration of the warning), and other applicable information. This information may be stored in the log as discussed above or sent to a third party for record keeping.

In some embodiments a data packet is broadcast multiple times to provide redundancy and give a message a better opportunity to be received.

It should be noted that the process illustrated in FIG. 2 is shown by way of example only. The order of the steps taken may be varied depending on the individual implementation of the notification system.

Figure 3:
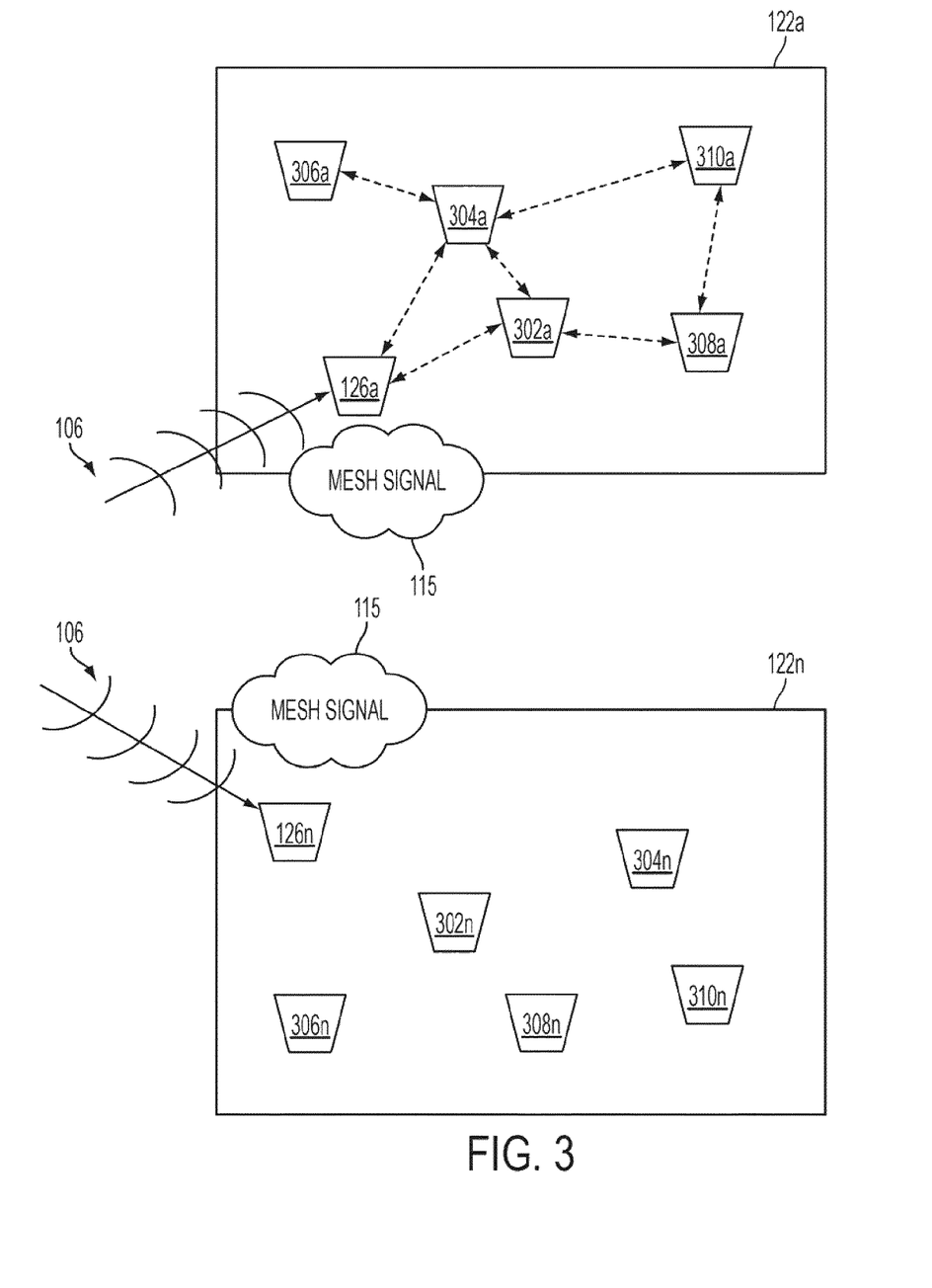
FIG. 3 illustrates an exemplary emergency alert system with multiple communication units assigned to a particular group, and communication between units within a group.

Referring to FIG. 3, one or both signals 106 and 115 may be received at buildings 122a, 122n. The signals 106 and 115 are initially received by one or more building coordinators, such as building coordinators 126a, 126n, each having a receiver that is capable of receiving the signals. For example, building coordinators 126a, 126n may each have an FM receiver that receives the signal 106 as well as a mesh transceiver that receives mesh signal 115. When the signals are received, the building coordinators 126a, 126n determine whether the signals are intended for distribution within the individual buildings. For example, signal 106 may be intended for distribution only within building 122a. Building coordinator 126a may relay the data packets contained within the signal 106 to other units 302a-310a within the building 122a via a mesh network. Multiple units within the building may receive the FM signal and multiple units within the facility may relay the data packet to provide redundancy. When building coordinator 126n receives signal 106 at building 122n, it determines the signal is not intended for that building and does not relay the message. As such, units 302n-310n do not forward the data packets amongst themselves via the Mesh network. In this manner, the signal 12 can direct messages to particular desired locations.

In other embodiments, building coordinators, such as building coordinators 126a, 126n, may be configured to forward a message regardless of who the message is intended for to ensure the message is distributed to all devices on the network. Each individual receiving unit may then analyze the message to determine if they are to perform various actions in response to the message.

At least some of the communication units within each building will include both a data broadcasting system receiver, such as an FM-RBDS receiver, an HD radio receiver, and a mesh network transceiver, such as a ZigBee compliant transceiver, an IEEE 805.15.4 transceiver, or other type of mesh network transceiver. FM-RBDS is a communications protocol standard for sending small amounts of digital information using conventional FM radio broadcasts. For example, a radio station may broadcast artist and title information in an FM-RBDS transmission occurring simultaneously with a standard FM transmission of a song. ZigBee is a low-cost, low power wireless mesh networking standard. The low cost allows for wide deployment of ZigBee devices over a large geographic area, while the low-power allows the devices to use battery power for operation.

Figure 4:
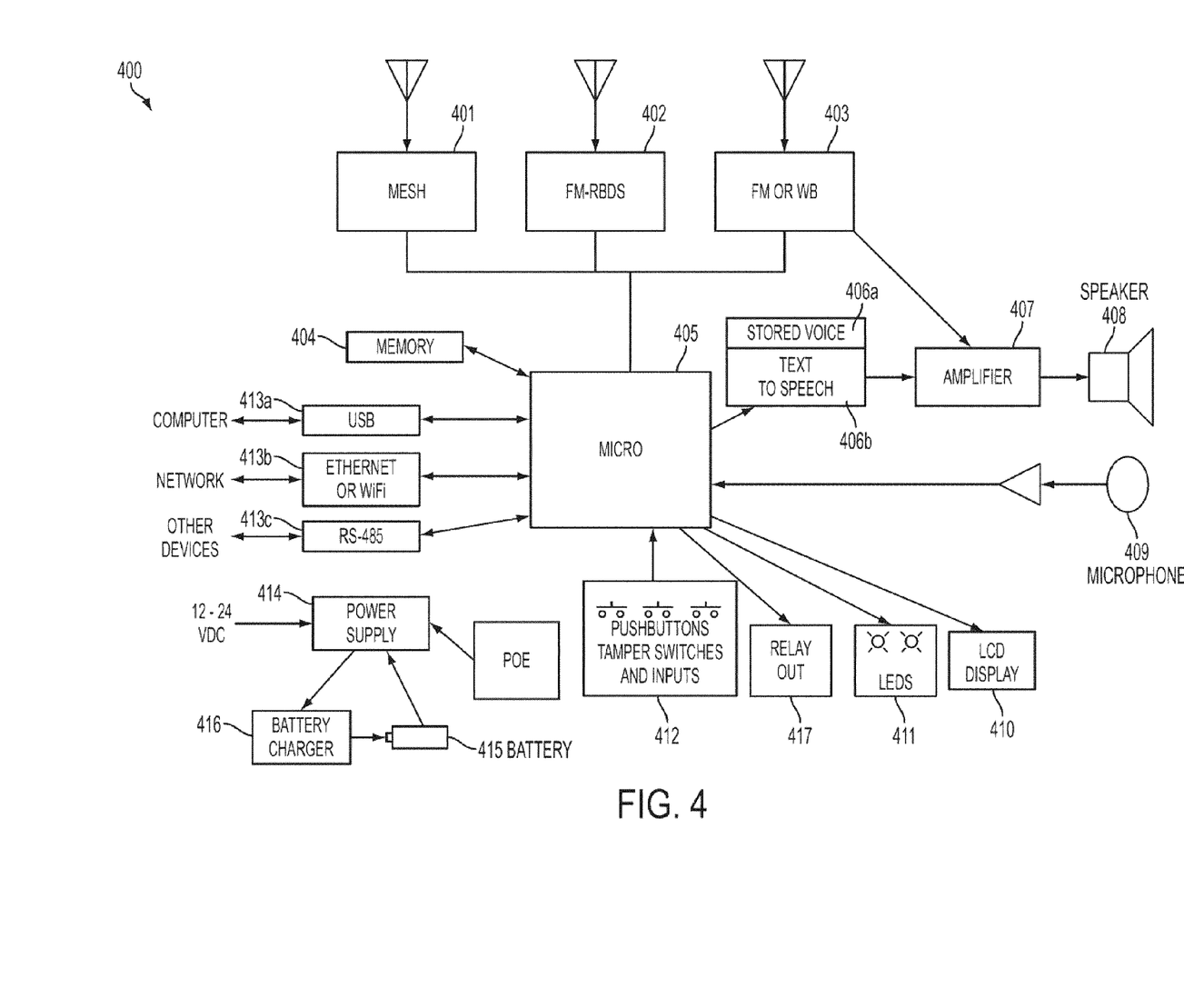
FIG. 4 is a block diagram illustrating exemplary elements of a communications unit.

Referring to FIG. 4, an exemplary communications unit 400 may include a mesh network transceiver 401 such as a ZigBee receiver, an FM-RBDS receiver 402 or other data broadcasting service receiver, an additional receiver for receiving analog or other communications such as an FM receiver and/or weather band receiver 403 configured to use specific area message encoding and/or emergency alert system messages. By providing a second receiver capable of receiving FM signals, the device may monitor two separate FM frequencies for emergency alerts, thereby increasing the redundancy of the device. All of the receivers and/or transceivers may be in electronic communication with a microprocessor 405 that analyzes a received data broadcasting service signal. The units may also include a memory 404 that stores a unique identifier for each unit, including a group component and a device component so that each unit can be uniquely identified and associated with a group of other units, such as units within a structural element and/or building. The memory 404 may store software related to the operation of the unit 400. This software may be updated regularly via both mesh and FM transmissions. For example, a message may contain a large number of packets, each packet containing a portion of an update to the software to be received and installed by unit 400. The memory may also store a set of alerts or pre-recorded messages, each with a unique message code. The memory may be a low-power, compact memory device such as an EPROM, EEPROM, a flash memory storage device, or RAM, however, it should be noted these types of memory are given by way of example only.

Once a data packet is received at one of the receivers or other communication ports of unit 400, the microprocessor may analyze the building and group components of the data packet to determine whether the data packet includes a message intended for the group or groups to which the communications unit belongs. If so, the unit 400 may relay the packet to other units within the facility via a mesh network transceiver 401 or other communication components (e.g., various communication ports). The unit also may present the alert component of the message via a display 410 (e.g., an LCD display), via one or more lights such as light emitting diodes (LEDs) 411 which may or may not strobe, or via an amplifier 407 and a speaker 408. Another potential output is relay out 417, which can activate an external device such as an additional siren or light.

It should be noted that LEDs 411 may be configured to indicate multiple levels of alerts. For example, the LEDs 411 may emit a blue light to indicate the unit is functioning properly. An amber light may indicate an event that requires a low level of response, such as a notification a building will be closing soon. The LEDs 411 may emit a red light when there is an emergency such as a fire or other natural disaster.

Audio messages may be presented based on the content of the message portion of the data packet. The processor may include program instructions that instruct the processor, upon receipt of the data packet, to identify the message code, access the memory 404 to determine whether a prerecorded message corresponds to the message code, and if so, load the prerecorded message from stored voice memory 406a and output the stored voice via the amplifier 407 and speaker 408. Similarly, the processor 405 may be instructed to compose a sentence of various spoken words contained in the stored voice memory 406a for outputting. If a prerecorded message or appropriate stored voice is not available, the processor may be instructed to direct the message portion of the data packet to a text to speech converter device 406b, the output of which is then directed to the amplifier 407 and speaker 408. Audio messages corresponding to the non-data FM signal also may be presented, based on the FM audio transmission.

In some embodiments, referring back to FIG. 1, the home computer 114, web based server 116 and security supervisory computers 118 may be configured so that only individuals with certain authorization levels can prepare custom messages, while other individuals are limited to prerecorded messages. In many embodiments, the user must enter some authorization code before transmitting any message at all over the service Referring back to FIG. 3, all of the units are preferably located within the communication range of at least one other unit within the applicable group so that all units may receive and/or transmit messages with at least one level of redundancy. In addition, not all units need be equipped with FM receivers. In particular, some units, such as those located on the interior of a building where FM reception is poor, may be equipped only with mesh network transceivers to reduce costs.

As shown in FIG. 4, some or all communication units may be equipped with an FM receiver 403 or other receiver that allows reception of live broadcasts and audio presentation of the broadcast through the amplifier 407 and speaker 408. This may be used, for example, in a situation where the alert message instructs individuals located near the unit to tune to an FM or weather band broadcast signal for more detailed information. In response to a message, unit 400 may turn on all related components and broadcast an emergency message received via the FM receiver 403.

Unit 400 may also include a series of input devices such as microphone 409, pushbuttons, tamper switches and other inputs 412, and various data communication interfaces such as USB port 413a, Ethernet port 413b and RS-485 port 413c. Microphone 409 may be operably connected to a signal processing component configured to receive analog signals from the microphone and convert the analog to digital signals. The audio may be compressed to balance ambient sound, adjusted for ambient sound and/or a person's speech level, then converted to data for transmission. The push buttons may be used to signal an emergency directly at an individual unit. In combination with the microphone 409, a person may use unit 400 to notify security of a problem, while transmitting voice to indicate the reason for calling for help. The tamper switches 412 may be configured to indicate when a unit has been opened or removed from its location. Additional inputs may include a gas sensor for detecting air quality and any potential hazardous materials, a fire or smoke detector, a motion detector, a camera, and any other suitable device for providing a signal or reading indicative of current conditions in a specific environment.

The unit 400 may further includes a power supply 414 configured to run on direct current, such as that produced by a AC/DC converter. The unit may also have an internal battery 415 and battery charger 416 such that when DC power is lost, the unit may continue to function normally. The unit 400 may self-monitor the power supply 414 and battery 415, along with various other functions (e.g., receiver functionality) in real time and alert one or more of the building coordinators if the unit is malfunctioning.

It should be noted that unit 400 is shown by way of example only. Additional units may be used which incorporate only a set of components used in unit 400. For example, a smaller unit may be designed to be powered by a battery only. The smaller unit may have fewer features such as lights and display screens to increase the life of the battery.

Referring again to FIG. 3, the units within a group such as building 122a may not only relay messages, but they may interrogate each other by sending poll signals and receiving acknowledgement responses. A host unit may collect all of the responses and determine whether any of the individual units may exhibit loss of power or other malfunctions by determining whether any expected devices have not responded. If a device has not responded, the host unit may generate an alert such as a visual message or audible signal, or it may send a communication back to a remote monitoring device where the alert may be monitored by one or more additional devices and/or monitoring personnel.

In some embodiments, one or more of the communication units 400 may be equipped with components that measure the strength of a signal. If signal strength suddenly changes, the unit may generate and present via the display and/or audio device and/or ZigBee transceiver an alert indicating a potential for hacking or jamming the network.

It may be appreciated that the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A communication device comprising:
   a receiver configured to receive a first data packet from a data broadcasting system, wherein the first data packet comprises at least a first bit that corresponds to a location of the communication device, at least a second bit that corresponds to group information for the communication device, and at least a third bit that corresponds to an alert component;
   a second receiver configured to receive a second input signal such that the communication device is configured to simultaneously monitor two input signals, wherein the two input signals are separate alert signals at different frequencies;
   a processor operably connected to the receiver and configured to process the first data packet to determine whether the first data packet includes a message for a group to which the communication device belongs;
   a memory operably connected to the processor and configured to store data and at least one unique identification code;
   a mesh network transceiver operably connected to the processor and configured to:
      transmit the received first data packet via a mesh network to at least one of a plurality of additional communication devices,
      receive additional data packets via the mesh network from at least one of the plurality of communication devices, and
      relay the additional received data packets via the mesh network to at least one of the plurality of communication devices;
   an output device operably connected to the processor and configured to present the message at the communication device corresponding to at least one of the first data packet and the additional received data packets if the first data packet includes a message for the group to which the communication device belongs; and
   a plurality of programming instructions that, when executed, instruct the processor to:
      inspect the received data packet to determine, based on the unique identification code, whether the data packet is directed to the device, and only present the alert corresponding to the data packet if the processor determines that the data packet is directed to the device.

2. The device of claim 1, wherein the device further comprises at least one location identifier that indicates a building in which the device is located.

3. The device of claim 1 further comprising at least one input, wherein the input comprises at least one of a push button, a key pad, a microphone, gas sensor, fire detector, motion detector, camera, and external data port.

4. The device of claim 1, further comprising a signal processing component configured to receive incoming audio from a microphone and convert the audio to data.

5. The device of claim 4, wherein an output audio level of the device is based on any ambient sound around the device as determined by the microphone.

6. The device of claim 4, wherein the output device is configured to transmit the data via the mesh network to another communications device.

7. The device of claim 1, wherein the output device comprises at least one of an audio alarm, a graphics display, a text display, a light, a siren, and a relay output.

8. The device of claim 1, wherein the output device comprises a speaker configured to output at least one of text-to-speech audio, sentences constructed from stored speech words, and FM broadcasted audio.

9. The device of claim 1, further comprising:
a text-to-speech converter,
wherein the processor is configured to process a portion of the received data packet to speech via the text-to-speech converter, and
wherein the output comprises an audio output that makes audible the processed speech.

10. The device of claim 1, wherein:
the memory stores a plurality of predetermined messages,
the processor is configured to process a portion of the received data packet to determine whether the packet includes a code corresponding to any of the predetermined messages, and if the alert comprises the predetermined message that corresponds to the code.

11. The device of claim 1 further comprising a power source, wherein the power source comprises at least one of a battery, AC power, Ethernet delivered power, and telephone line delivered power.

12. The device of claim 1, further comprising at least one communications port.

13. The device of claim 1, further comprising a second receiver configured to receive a data packet from the data broadcasting system.

14. The device of claim 1, wherein the processor is further configured to monitor the receiver and the mesh network transceiver for any loss of signal.

15. A communication device comprising:
a first receiver configured to receive a first data packet from a first data broadcasting system, wherein the first data packet comprises group information and an alert component, wherein the first data packet comprises at least a first bit that corresponds to a location of the communication device, at least a second bit that corresponds to group information for the communication device, and at least a third bit that corresponds to an alert component;
a second receiver configured to receive a second data packet or audio from a second data broadcasting system, wherein the second data packet comprises group information and an alert component such that the communication device is configured to simultaneously monitor two input signals, wherein the two input signals are separate alert signals at different frequencies;
a processor operably connected to the first receiver and the second receiver and configured to process any received data packets to determine whether the first packet includes a first message for a group to which the communication device belongs and whether the second packet includes a second message for the group to which the communication device belongs;
a memory operably connected to the processor and configured to store received data packets and at least one unique identification code;
a mesh network transceiver operably connected to the processor and configured to:
transmit the received first data packet via a mesh network to at least a second communication device,
receive additional data packets via the mesh network from at least one of the plurality of communication devices, and
relay the additional received data packets via the mesh network to at least one of the plurality of communication devices;
an input device operably connected to the processor and configured to provide additional data related to an operating environment of the communications device;
an output device operably connected to the processor and configured to:
present an alert based upon the first message at the communication device corresponding to at least one of the first data packet, the second data packet and the additional received data packets if the first data packet includes a first message for the group to which the communication device belongs, and
present an alert based upon the second message at the communication device corresponding to the second data packet and the additional received data packets if the second data packet includes a second message for the group to which the communication device belongs; and
a plurality of programming instructions that, when executed, instruct the processor to:
inspect the received data packet to determine, based on the unique identification code, whether the data packet is directed to the device, and
only present the alert corresponding to the data packet if the processor determines that the data packet is directed to the device.

16. The device of claim 15, wherein said input comprises at least one of a push button, a key pad, a microphone, gas sensor, fire detector, motion detector, camera, and external data port.

17. The device of claim 15, wherein the output device comprises at least one of an audio alarm, a text display, a light, a siren, and a speaker.

18. The device of claim 15, wherein:
the memory stores a plurality of predetermined messages,
the processor is configured to process a portion of the received data packet to determine whether the packet includes a code corresponding to any of the predetermined messages, and if the alert comprises the predetermined message that corresponds to the code.

19. A communication device comprising:
a mesh transceiver configured to:
receive a first data packet transmitted from another device over a mesh network, wherein the first data packet comprises location information, group information and an alert component, wherein the first data packet comprises at least a first bit that corresponds to a location of the communication device, at least a second bit that corresponds to group information for the communication device, and at least a third bit that corresponds to an alert component,
receive a second input signal such that the communication device is configured to simultaneously monitor two input signals, wherein the two input signals are separate alert signals at different frequencies;
transmit the received first data packet via a mesh network to at least one of a plurality of communication devices,
receive additional data packets via the mesh network from at least one of the plurality of communication devices, and
relay the additional received data packets via the mesh network to at least one of the plurality of communication devices;
a processor operably connected to the mesh transceiver and configured to:
process the received data packets, wherein the processing comprises:
determining if the received data packets are for distribution by the communication device based upon the location information contained within each received data packet, and
determining if the first data packet includes a message for a group to which the communication device belongs, and instruct the mesh transceiver to transmit the received first data packet if it is determined the first data packet is for distribution by the communication device;
a memory operably connected to the processor and configured to store received data packets and at least one unique identification code;
an input device operably connected to the processor and configured to provide additional data related to an operating environment of the communications device; and
an output device operably connected to the processor and configured to present an alert the message at the communication device corresponding to at least one of the first data packet and the additional received data packets if the first data packet includes a message for the group to which the communication device belongs; and
a plurality of programming instructions that, when executed, instruct the processor to:
inspect the received data packet to determine, based on the unique identification code, whether the data packet is directed to the device, and
only present the alert corresponding to the data packet if the processor determines that the data packet is directed to the device.

* * * * *